(12) United States Patent
Jang et al.

(10) Patent No.: US 7,916,222 B2
(45) Date of Patent: Mar. 29, 2011

(54) STEREOSCOPIC DISPLAY DEVICE AND DRIVING METHOD THEREOF

(75) Inventors: Hyoung-Wook Jang, Suwon-si (KR); Jang-Doo Lee, Suwon-si (KR); Hui Nam, Suwon-si (KR); Beom-Shik Kim, Suwon-si (KR); Myoung-Seop Song, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 1124 days.

(21) Appl. No.: 11/631,163

(22) PCT Filed: Jun. 29, 2005

(86) PCT No.: PCT/KR2005/002045
§ 371 (c)(1),
(2), (4) Date: Dec. 29, 2006

(87) PCT Pub. No.: WO2006/004342
PCT Pub. Date: Jan. 12, 2006

(65) Prior Publication Data
US 2008/0013001 A1    Jan. 17, 2008

(30) Foreign Application Priority Data
Jun. 30, 2004    (KR) .................. 10-2004-0050582

(51) Int. Cl.
*G02F 1/1335*    (2006.01)
(52) U.S. Cl. .......................................... 349/15
(58) Field of Classification Search .......... None
See application file for complete search history.

(56) References Cited

U.S. PATENT DOCUMENTS

| | | | |
|---|---|---|---|
| 540,137 A | 5/1895 | Blondel | |
| 5,751,479 A | 5/1998 | Hamagishi et al. | |
| 5,945,965 A | 8/1999 | Inoguchi et al. | |
| 6,388,653 B1 * | 5/2002 | Goto et al. | 345/98 |
| 6,580,405 B1 * | 6/2003 | Yamazaki et al. | 345/7 |

FOREIGN PATENT DOCUMENTS

| | | |
|---|---|---|
| EP | 0 829 744 | 3/1998 |
| JP | 05-122733 | 5/1993 |
| JP | 09-073049 | 3/1997 |
| JP | 10-246869 | 9/1998 |
| JP | 2004-264338 | 9/2004 |
| JP | 2006-005463 | 1/2006 |
| KR | 10-0445613 | 8/2004 |
| KR | 10-2005-0078328 | 8/2005 |

OTHER PUBLICATIONS

"Reduction of the Thickness of Lenticular Steroescopic Display Using Full Color LED Panel," to Yamamoto, et al. Proceedings of the SPIE, Jan. 21, 2002.
Chinese Office Action dated Sep. 11, 2009 of the corresponding Chinese Patent Application No. 2005800291985.

* cited by examiner

*Primary Examiner* — David Nelms
*Assistant Examiner* — Lucy P Chien
(74) *Attorney, Agent, or Firm* — Robert E. Bushnell, Esq.

(57) ABSTRACT

The stereoscopic display device includes a display unit including a first pixel group for displaying a first image and a second pixel group for displaying the second image, a barrier having transparent regions and opaque regions such that the first image and the second image are observed through the transparent regions at different points and a light source for supplying light to the display unit. The light source has the different brightness between the first mode and the second mode.

16 Claims, 3 Drawing Sheets

[Fig. 1]
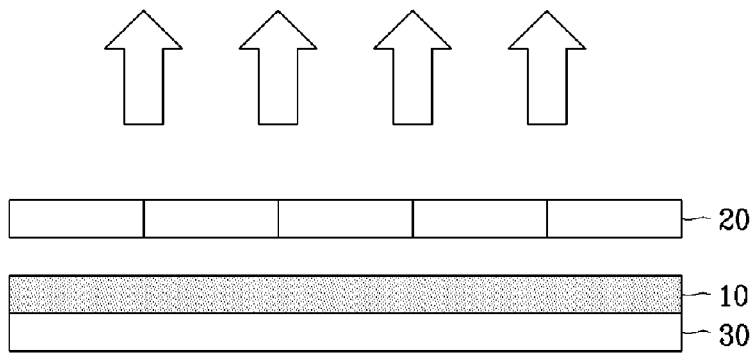
[Fig. 2]
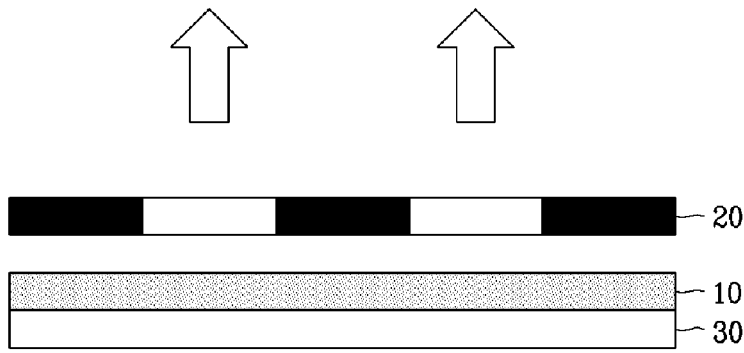
[Fig. 3]
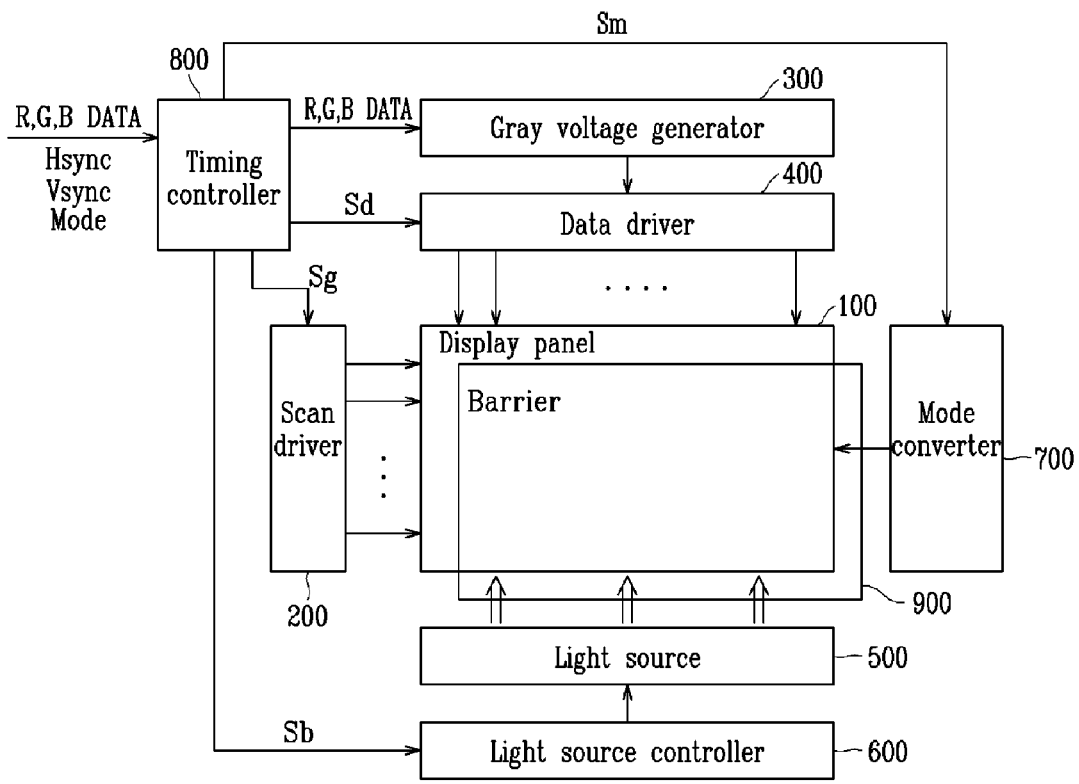

[Fig. 4]
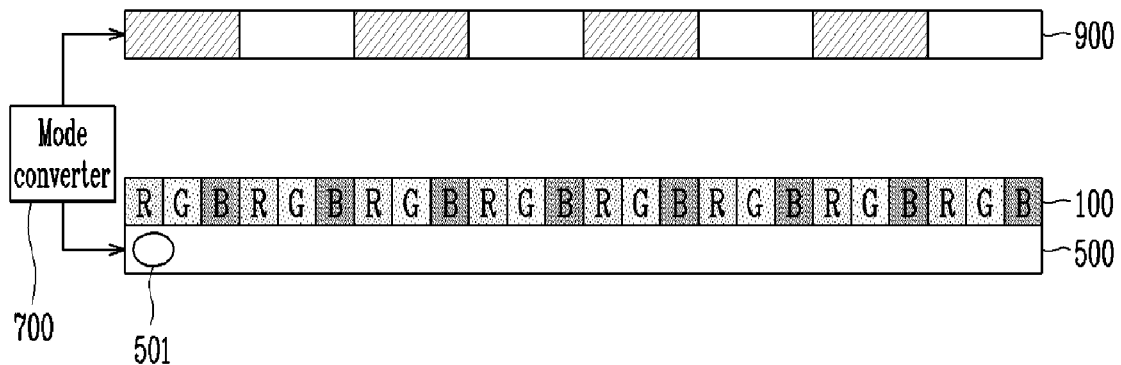
[Fig. 5]
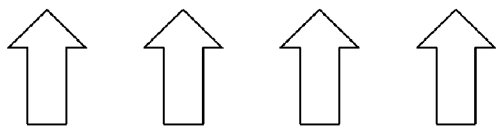
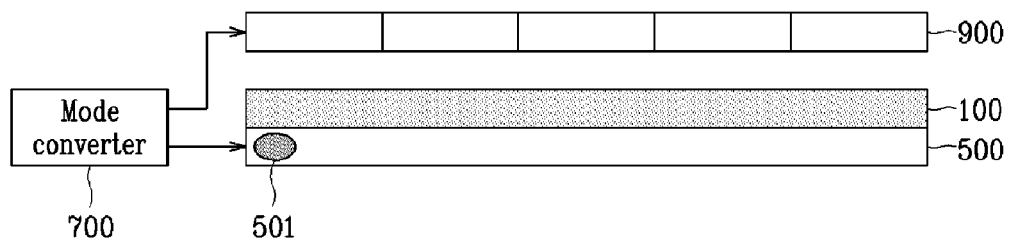
[Fig. 6]
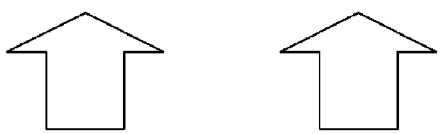
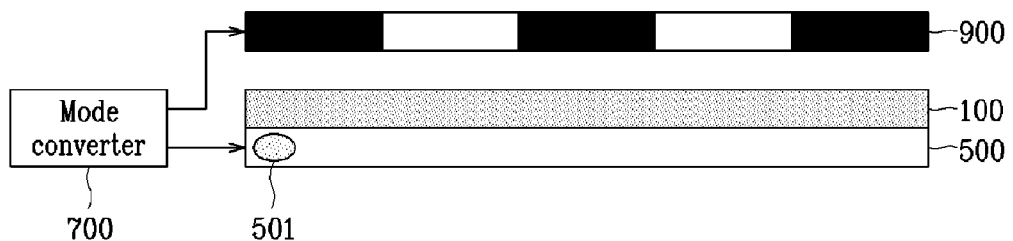

[Fig. 7]
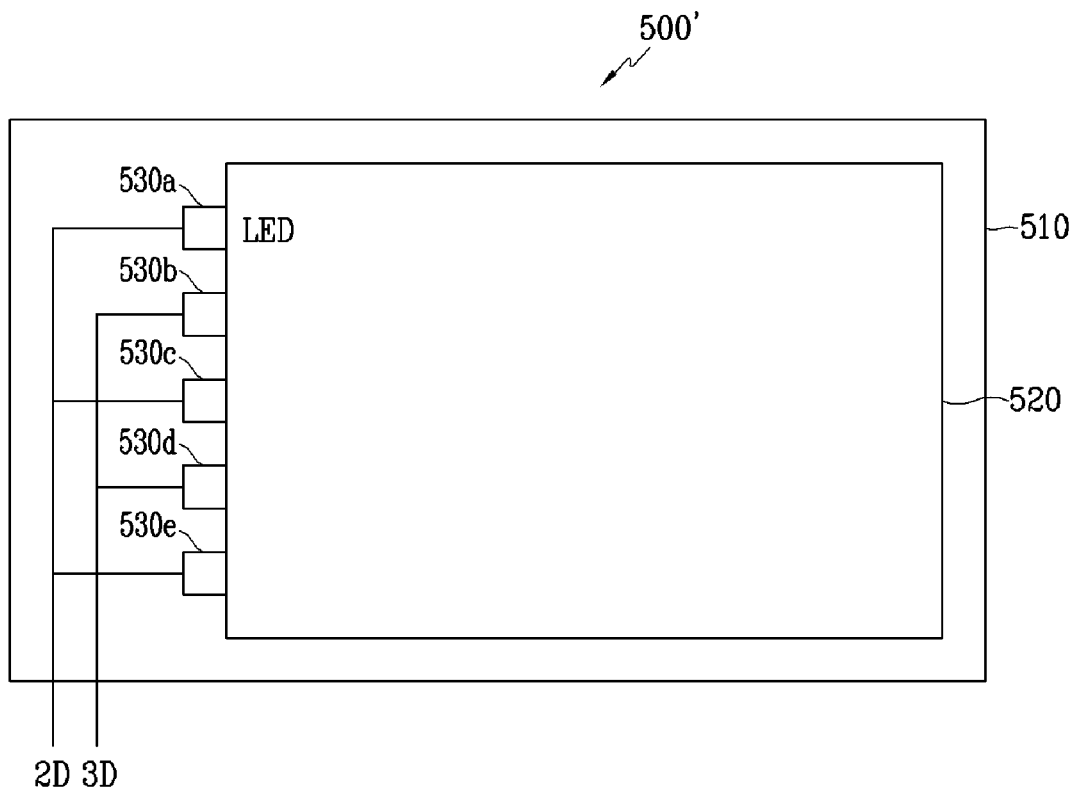
[Fig. 8]
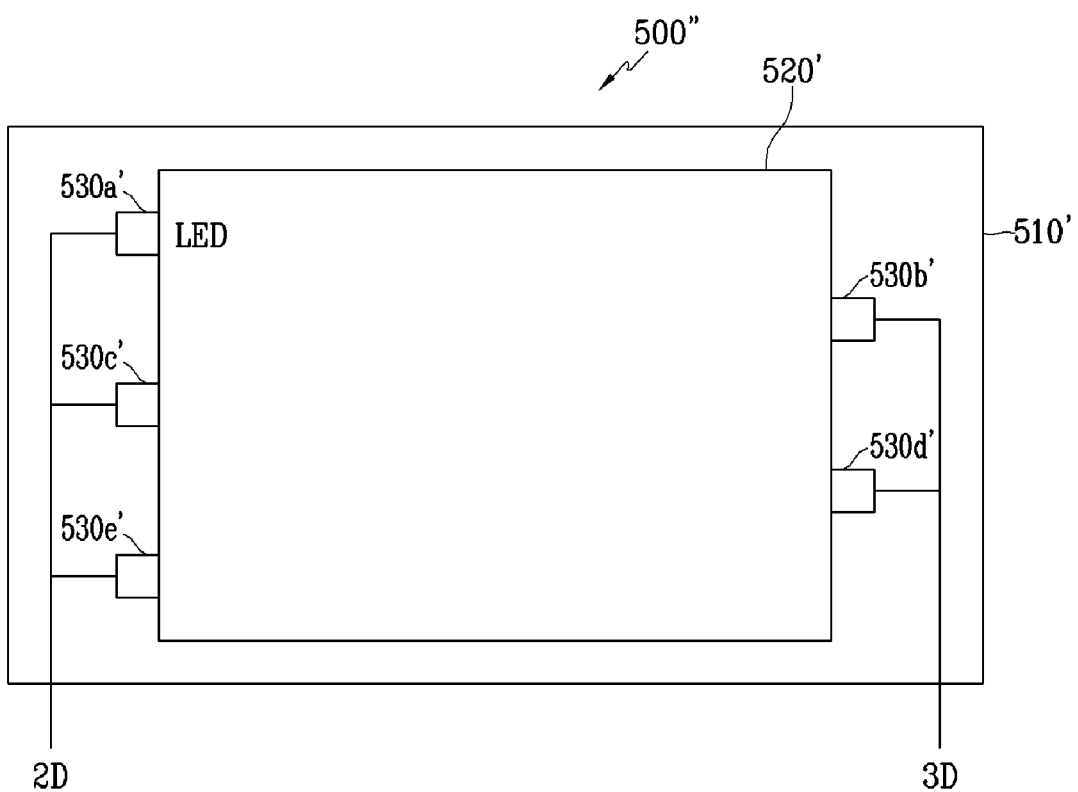

STEREOSCOPIC DISPLAY DEVICE AND DRIVING METHOD THEREOF

TECHNICAL FIELD

This application claims priority to and the benefit of Korean Patent Application 10-2004-0050582 filed in the Korean Intellectual Property Office on Jun. 30, 2004, the entire content of which is incorporated herein by reference.

The present invention relates to a stereoscopic display device and a driving method thereof, and more particularly to a time-divisional stereoscopic display device and a driving method thereof.

BACKGROUND ART

In general, people perceive a stereoscopic effect physiologically and experientially. In three-dimensional image display technology, a stereoscopic effect of an object is produced by using binocular parallax, which is a primary factor in recognizing a stereoscopic effect at a short distance.

Stereoscopic images are viewed using methods involving wearing of spectacles and methods not involving wearing of spectacles.

Typical methods not involving wearing of spectacles include a lenticular method in which a lenticular lens plate having an array of vertically arranged cylindrical lenses is formed in front of an image panel, and a parallax barrier method that separates left-eye and right-eye images using a barrier to obtain a stereoscopic effect. For example, the parallax barrier has a merit that it may convert an image between a 2D mode and a 3D mode, and therefore it is widely applied to stereoscopic display devices in the form of notebooks, mobile phones, etc.

FIG. 1 is a schematic view of a stereoscopic display device in case of displaying a 2D image according to a conventional parallax barrier, and FIG. 2 is a schematic view a stereoscopic display device in case of displaying a 3D image according to a conventional parallax barrier.

As shown in FIG. 1 and FIG. 2, a stereoscopic image display device includes a display panel 10, a barrier 20 and a light source 30, for displaying 2D and 3D images.

The display panel 10 includes right-eye pixels for displaying a right-eye image and left-eye pixels for displaying a left-eye image.

The light source 30 is placed in a rear of the display panel 10 to provide light for the respective liquid crystal pixels of the display panel 10.

In addition, the barrier 20 is placed in front of the display panel 10 and includes liquid crystal cells corresponding to respective the right-eye and the left-eye pixels. The liquid crystal cell is varied to be transparent or opaque and functions to shutter image displayed on the display panel 10, and therefore, it is also called a liquid crystal shutter. In more detail, as shown in FIG. 1, when the display panel 10 displays a 2D image, the liquid crystal cells all are varied to be transparent so that they allow the image displayed on the display panel 10 to pass directly therethrough. Also, as shown in FIG. 2, when the display panel 10 displays a 3D image according to whether the displayed image is the left-eye image or the right-eye image, one group in the two groups of the right-eye pixels and the left-eye pixels becomes transparent to form a transparent region, and another group therein becomes opaque to form an opaque region.

With such a structure, 2D and 3D images can be selectively displayed.

The above information disclosed in this Background section is only for enhancement of understanding of the background of the invention and therefore, it may contain information that does not form the prior art that is already known in this country to a person or ordinary skill in the art.

DISCLOSURE OF INVENTION

Technical Problem

When displaying a 3D image, the barrier forms an opaque region, and accordingly, the light intensity is reduced to a half compared to when displaying a 2D image. Therefore, the stereoscopic image display device has a drawback that the brightness of the 3D image becomes deteriorated.

The present invention has been made in an effort to provide a barrier type stereoscopic display device and a driving method thereof having an advantage of providing an enhanced intensity for displaying a 3D image.

Technical Solution

An exemplary stereoscopic display device according to an embodiment of the present invention includes a display unit including a first group of pixels for displaying a first image and a second group of pixels for displaying a second image, a barrier forming a transparent regions and an opaque regions such that the first image and the second image transmit the barrier in first mode and the first and second images are observed at different points in second mode and a light source for supplying light to the display unit, wherein the light source emits light with different brightness in the first and the second modes.

A mode controller may be further provided so as to control the barrier and the light source in the first mode and second modes.

The barrier may be formed with a liquid crystal shutter, and the mode controller controls the operation of the barrier at the first and second modes by controlling molecular arrangement of the liquid crystal shutter.

The light source may include a plurality of light emitting diodes for emitting the first to the third colors.

The light source may include a secondary light source, and the mode controller turns on the secondary light source in the second mode.

The mode controller may control a current applied to the light source so as to achieve different brightness in the first and second modes.

A brightness of the light source in the first mode may substantially twice of the brightness in the second mode.

In further embodiment, an exemplary stereoscopic display device according to an embodiment of the present invention includes a display unit including a first group of pixels for displaying a first image and a second group of pixels for displaying a second image, a barrier formed in front of the display unit, a light source for sequentially providing lights of at least two colors for the display unit and a data driver for applying a gray scale voltage corresponding to gray scale data for the first and second images to the first and second groups of pixel. The data driver forms the gray scale voltage corresponding to gray scale data differently in a first mode and a second mode and applies the grayscale voltage to the first and second groups of pixel.

Another exemplary method of driving a stereoscopic display device according to an embodiment of the present invention drives a stereoscopic display device including a display unit including a first group of pixels for displaying a first image and a second group of pixels for displaying a second image and displaying an image in first and second image modes, and a light source for providing light to the display unit. The exemplary method includes determining an image mode of the display unit, controlling a brightness of the light source corresponding to the image mode, and applying a grayscale data to the first group of pixels and the second group of pixels. The light source emits light with different brightness in the first and second modes.

BRIEF DESCRIPTION OF THE DRAWINGS

FIG. 1 shows a 2D image mode operation of a conventional stereoscopic image display device.

FIG. 2 shows a 3D image mode operation of a conventional stereoscopic image display device.

FIG. 3 is a schematic top plan view of a stereoscopic image display device according to a first exemplary embodiment of the present invention.

FIG. 4 is a schematic sectional view of a stereoscopic image display device shown in FIG. 3.

FIG. 5 shows an operation in a 2D image mode of a stereoscopic image display device according to a first exemplary embodiment of the present invention.

FIG. 6 shows an operation in a 3D image mode of a stereoscopic image display device according to a first exemplary embodiment of the present invention.

FIG. 7 is a schematic view illustrating the configuration of a light source according to a second exemplary embodiment of the present invention.

FIG. 8 is a schematic view illustrating the configuration of a light source according to a third exemplary embodiment of the present invention.

MODE FOR THE INVENTION

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 3 is a schematic top plan view of a stereoscopic image display device according to a first exemplary embodiment of the present invention.

As shown in FIG. 3, a stereoscopic image display device includes a display panel 100, a scan driver 200, a gray voltage generator 300, a data driver 400, a light source 500, a light source controller 600, a mode converter 700, a timing controller 800, and a barrier 900.

The display panel 100 is formed as a liquid crystal display (LCD) panel, and includes a plurality of scan lines (not shown) for transmitting selection signals, a plurality of data lines (not shown) formed crossing but insulated from the plurality of scan lines for transmitting grayscale voltage corresponding to grayscale data, and a plurality of liquid crystal cells defined by the plurality of scan lines and the plurality of data lines.

The barrier 900 is placed in the front of the display panel 100 and includes liquid crystal cells to be transparent or opaque according to an image displayed at the display panel 100 to allow or prevent passing of the image.

The scan driver 200 sequentially applies a selection signal to the scan line to turn on the thin film transistor having the gate electrode coupled to the scan line to which the selection signal is applied.

The grayscale voltage generator 300 generates the grayscale voltage corresponding to the grayscale data and supplies it to the data driver 400.

The data driver 400 applies the grayscale voltage outputted from the grayscale voltage generator 300 to the data lines.

The light source 500 includes red (R), green (G), and blue (B) light emitting diodes (not shown) and a secondary-light source (not shown).

The light source controller 600 controls the lighting time of the light emitting diodes. In this embodiment, a point in time when the data driver 400 applies the gray scale data to the data lines and a point in time when the light source controller 600 lights the red (R), green (G) and blue (B) light emitting diodes can be synchronized with each other by the control signals supplied by the timing controller 800.

The mode converter 700 controls the barrier 900 such that the liquid crystal cells become transparent or opaque in response to a mode signal Sm input from the timing controller 800, and controls the brightness of the light source 500

The timing controller 800 receives grayscale data of R, G, and B data, a horizontal synchronization signal Hsync, and a vertical synchronization signal Vsync externally or from a graphic controller (not shown), respectively supplies required control signals Sg, Sd, and Sb to the scan driver 200, the data driver 400, and the mode converter 700, and supplies the grayscale data of R, G, and B data to the grayscale voltage generator 300.

As such, according to an exemplary embodiment of the present invention, the light source 500 includes the secondary light source, and the mode converter 700 controls on/off of the secondary light source according to the display image mode. Therefore, a 3D image can be displayed without lowering the brightness.

A driving method of a stereoscopic image display device according to a first exemplary embodiment of the present invention will be described with reference to FIG. 4 to FIG. 6.

FIG. 4 is a schematic sectional view of a stereoscopic image display device shown in FIG. 3. FIG. 5 and FIG. 6 respectively show an operation in a 2D image mode and a 3D image mode of a stereoscopic image display device according to a first exemplary embodiment of the present invention.

As shown in FIG. 4 to FIG. 6, the display panel 100 includes the barrier 900 formed in front thereof and the light source 500 formed in the rear thereof. According to the first exemplary embodiment of the present invention, the barrier 900 is formed with liquid crystal shutters and the liquid crystal shutter transmits or interrupts image utilizing a molecular arrangement of the liquid crystal.

In more detail, the liquid crystal realizes modulations in a double refraction, a rotatory polarization, a dichroism, a light dispersion property, etc., by varying a molecular arrangement according to a voltage applied thereto. Such modulations can be utilized to transmit or interrupt images.

As described above, the light source 500 includes light emitting diodes for respectively emitting red (R), green (G) and blue (B) lights, and a secondary light source 501 for emitting secondary light at the 3D image mode.

Accordingly, the mode converter 700 controls the molecular arrangement of the barrier 900 according to the control signal Sm applied from the timing controller 800, and in the case of displaying a 3D image, it turns on the secondary light source 501 thereby increasing the light intensity supplied to the display panel 100.

In the case of displaying 2D images, as shown in FIG. 5, the mode converter 700 controls the molecular arrangement of the liquid crystal shutter to transmit the whole image displayed by the pixels of the display panel 100, and turn off the secondary light source 501 to supply an appreciate intensity of the light to the display panel 100.

As shown in FIG. 6, in case of displaying a 3D image, the mode converter 700 controls the barrier 900 so as to form the transparent region and the opaque region. At this time, through the same transparent region, the left-eye image is inputted to the left-eye pixel and is seen only by the left-eyes while the right-eye image is inputted to the right-eye pixel and is seen only by the right-eye. The mode converter 700 turns on the secondary light source 501 to increase the intensity of light from the light source illuminating the display panel 100.

Because the display panel 100 are supplied with the appreciate light in each of the 2D image mode and the 3D image mode, the 3D image can have a sufficient brightness.

In other words, the light source 500 is controlled to have a different brightness in the 2D image mode and the 3D image mode so that proper light can be provided for the display panel 100.

Therefore, in the 2D image mode, the light source has a proper brightness for the 2D image so that power consumption and a excessive brightness are avoided, and in the 3D image mode, the light source has a proper brightness for the 3D image so that the 3D image may be displayed in a sufficient brightness.

In this embodiment, the brightness of the light source 500 was controlled by turning on/off of the secondary light source 501 as shown in FIG. 5 and FIG. 6. However, in another exemplary embodiment, the brightness of the light source 500 may be controlled by controlling an amount of current flowing at light source 500 without an additional light source 501.

A second exemplary embodiment of the present invention will be described with reference to FIG. 7. In this embodiment, the light source 500 is controlled to have a proper brightness by controlling a current flowing through a light emitting element rather than by turning on/off of a secondary light source, differently from the first exemplary embodiment.

FIG. 7 is a schematic view illustrating a configuration of a light source according to a second exemplary embodiment of the present invention.

As shown in FIG. 7, a light source 500' includes a light guiding plate 510, a light emitting element 520, and a plurality of power terminals 530*a* to 530*e*.

The light emitting element 520 is formed on the light guiding plate 510, and the plurality of the power terminals 530*a* to 530*e* are formed at the side of the light emitting element 520. The light emitting element 520 may be formed with light emitting diodes, and emits light corresponding to the current applied to a plurality of the power terminals 530*a* to 530*e*.

The current applied to a plurality of the power terminals 530*a* to 530*e* is controlled by the mode converter (not shown in FIG. 7), and the mode converter applies the current for the power terminals 530*a*, 530*c*, and 530*e* in the 2D image mode while the mode converter applies the current for all the power terminals 530*a* to 530*e* in the 3D image mode.

With such a scheme, the light source 500' can be controlled to have an increased brightness in the 3D mode, thereby improving the brightness of the 3D images.

A third exemplary embodiment of the present invention will be described with reference to FIG. 8.

The third exemplary embodiment is similar to the second exemplary except that the terminals for inputting current into the light source are provided in both sides of the light emitting element. For better understanding and ease of description, features according to the third embodiment that are the same as the second embodiment will not be described in further detail, and only the difference will be focused in the following description.

FIG. 8 is a schematic view illustrating a configuration of a light source according to a third exemplary embodiment of the present invention.

According to the third exemplary embodiment of the present invention, a light source 500" has a plurality of power terminals 530*a'* to 530*e'* at both sides of a light emitting device 520', as shown in FIG. 8.

In the above embodiment, a mode converter controlled the intensity of light emitted from the light source 500' and 500" so as to enable a sufficient brightness in the 3D image mode. However, as a variation of such exemplary embodiments, the gray voltage generator (see FIG. 3) may be changed to varying the grayscale data of the 3D image to enable a sufficient brightness in the 3D image mode.

In this case, since the gray voltage generator 300 sets different gamma curves for the 2D image and the 3D image and applies a high voltage to the data driver 400, the 3D image may have a sufficient brightness.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to an embodiment of the present invention, the light source can be controlled such that proper light is supplied to a display panel depending on the display modes of the 2D image mode and the 3D image mode. Thus, a sufficient brightness may be achieved in the 3D image.

The invention claimed is:

1. A stereoscopic display device comprising:
    a display unit including a first group of pixels for displaying a first image and a second group of pixels for displaying a second image;
    a barrier forming a transparent region and an opaque region such that the first and second images transmit the barrier in a first mode and the first and second images are observed at different points in a second mode;
    a first light source for supplying light to the display unit having light emitting diodes for emitting red, green and blue light;
    a second light source for supplying light to the display unit having light emitting diodes for emitting red, green and blue light; and
    a mode controller to control the barrier, the first light source and the second light source in the first and second modes,
    wherein the mode controller turns on only the first light source in the second mode and turns on both the first and the second light source in the first mode, said second mode creates a two-dimensional image and said first mode creates a three-dimensional image as seen by a viewer.

2. The stereoscopic display device of claim 1, wherein the barrier is formed with a liquid crystal shutter and the mode controller controls the barrier to operate differently in the first and second modes by controlling the molecular arrangement of the liquid crystal shutter.

3. The stereoscopic display device of claim 1, wherein the mode controller controls a current applied to the first light source so as to achieve different brightness in the first and second modes.

4. The stereoscopic display device of claim 1, wherein the brightness of the first and second light source in the first mode is twice of the brightness the first light source in the second mode.

5. The stereoscopic display device of claim 1, wherein the display unit is formed with a liquid crystal display element.

6. The stereoscopic display device of claim 1, wherein the first image is a left-eye image and the second image is a right-eye image.

7. A stereoscopic display device, comprising:
a display unit including a first group of pixels for displaying a first image and a second group of pixels for displaying a second image;
a barrier formed in front of the display unit;
a light source for sequentially providing lights of at least two colors for the display unit; and
a data driver for applying a grayscale voltage corresponding to a grayscale data to the first group of pixels and the second group of pixels, wherein the data driver forms the grayscale voltage corresponding to the grayscale data differently in a first mode and a second mode and applies the grayscale voltage to the first and second groups of pixels,
wherein brightness of either the first group of pixels or the second group of pixels is increased in the second mode by providing a higher voltage to the data driver increasing the grayscale voltage in the second mode than a lower voltage provided to the data driver decreasing the grayscale voltage in the first mode.

8. The stereoscopic display device of claim 7, wherein the barrier forms a transparent region and an opaque region such that the first and second images of the display unit transmit the barrier in the first mode and the first and second images are observed at different points in the second mode.

9. The stereoscopic display device of claim 7, wherein the light source includes at least three light emitting diodes that respectively emit first to third colors.

10. The stereoscopic display device of claim 9, further comprising a light source controller controlling lighting of the at least three light emitting diodes.

11. The stereoscopic display device of claim 7, wherein the first mode is a 2D image mode, and the second mode is a 3D image mode.

12. A method of driving a stereoscopic display device, said stereoscopic display device comprising a display unit that includes a first group of pixels for displaying a first image and a second group of pixels for displaying a second image and displaying an image in first and second image modes, a data driver for applying a grayscale voltage, and a first light source and a second light source for providing light to the display unit, the method comprising:
determining an image mode for driving the stereoscopic display device, said image mode including a first image mode and a second image mode;
controlling a brightness of the stereoscopic display device by turning on only the first light source or turning on both the first and second light source depending on the image mode determined;
applying grayscale data to the first group of pixels and the second group of pixels;
turning on only the first light source in the first mode; and
turning on both the first and the second light source in the second mode,
wherein said first mode creates a two-dimensional image and said second mode creates a three-dimensional image as seen by a viewer, and
wherein brightness of either the first group of pixels or the second group of pixels is increased in the second mode by providing a higher voltage to the data driver in the second mode than a lower voltage provided to the data driver in the first mode.

13. The method of driving a stereoscopic display device of claim 12, comprised of incorporating a secondary light source in the light source and controlling the brightness of the light source by controlling turning on/off of the secondary light source.

14. The method of driving a stereoscopic display device of claim 12, comprised of controlling the brightness of the light source by controlling a current applied to the light source.

15. A stereoscopic display device driven by the method of claim 12, comprised of a barrier forming a transparent region and an opaque region having the first and second images transmit the barrier in a first mode and the first and second images observed at different points in a second mode.

16. A stereoscopic display device driven by the method of claim 12, comprised of a data driver applying a grayscale voltage corresponding to the grayscale data to the first group of pixels and the second group of pixels, and forming the grayscale voltage in correspondence to the grayscale data differently in the first mode and the second mode and applying the grayscale voltage to the first and second groups of pixels.

* * * * *